Nov. 28, 1939.　　　F. W. KAMMERER　　　2,181,812
DOOR SADDLE
Filed Aug. 6, 1937
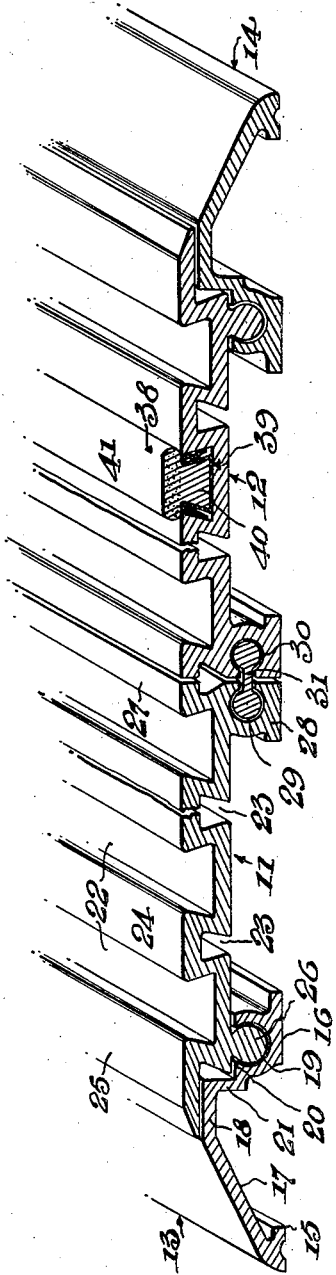
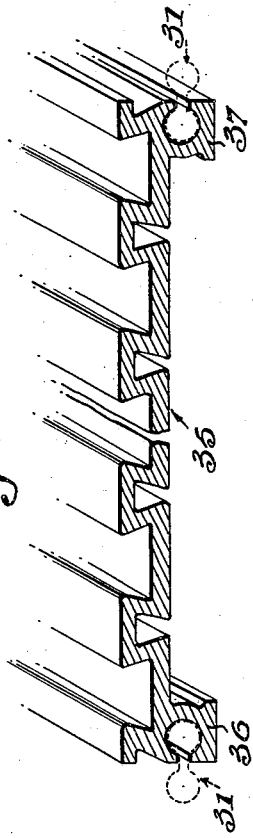
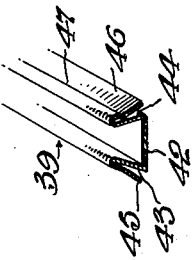
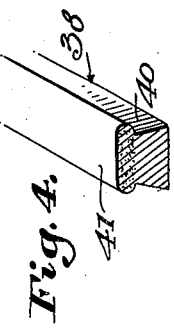
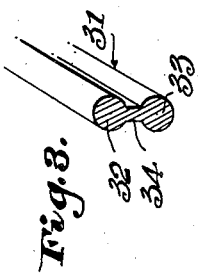
Inventor
FRED W. KAMMERER Patented Nov. 28, 1939

2,181,812

UNITED STATES PATENT OFFICE 2,181,812

DOOR SADDLE

Fred W. Kammerer, New York, N. Y.

Application August 6, 1937, Serial No. 157,793

9 Claims. (Cl. 20—64)

The present invention relates to door saddles and has as an object to provide saddles particularly designed for adaptability, safety and efficiency in use, and for certain installational purposes.

Different situations demand saddles of different widths and according to one phase of the invention I provide sectional saddles adaptable to the particular requirement. I also provide an improved tread strip arrangement and a saddle installation particularly designed for the reception of abrasive, anti-slipping tread strips.

I shall proceed to describe the invention in detail with reference to the illustrative embodiments shown in the accompanying drawing.

In the drawing:

Figure 1 is a transverse section and partial perspective of a sectional saddle in accordance with the present invention.

Figure 2 similarly shows a tread section utilizable in a saddle constructed as in Figure 1.

Figure 3 similarly shows a section interlocking member.

Figure 4 similarly shows a tread strip.

Figure 5 similarly shows a tread strip casing.

Referring first to Figures 1 to 5, reference numerals 11 and 12 designate tread sections of a saddle which also includes the side sections 13 and 14. The side section 13 has foot portions 15 and 16 adapted to rest on any suitable support, and a wall 17 sloping upwardly from the portion 15 to an elevated flat topped medial portion 18. The foot portion 16 is formed with a top longitudinally extending inwardly enlarged recess 19 which is preferably, and as here shown, of arcuate contour cross sectionally. Inwardly of the recess is a shoulder 20 from which a vertical wall 21 rises to the top 18.

The tread portion 11 is formed with top and bottom dove-tailed grooves 22 and 23 which are alternated, the lands 24 between the top grooves lying in the same plane. One of the terminal portions 25 is in the form of a bevelled flange and under the inner edge of the latter the tread is formed with a longitudinally extending rib 26 which is complementary in form to the recess 19 and is engageable in the latter by relative longitudinal movement of the sections 11 and 13. With the sections thus engaged the flange 25 closely overlies the portion 18 of section 13 and the bevelled edge of the flange is in substantial continuation of the slope of wall portion 17. The flat top surface of the flange is co-planar with the tops of lands 24.

At its edge opposite the flange 25 section 11 is provided with a flange 27 which is half the width of a land 24 and therebeneath the tread section is provided with a longitudinally extending foot or pedestal 28 which in conjunction with the support 16 is adapted to support the tread section in level position. The inner edge of the tread section has a longitudinally extending recess 29 formed therein, this, as here shown, being of substantially the same form cross-sectionally as the recess 19.

The tread section 12 is exactly the same as the section 11 and is turned around to bring its recess 30 into register with the recess 29. An interlocking member 31 has edge portions 32 and 33 of arcuate section and complementary to the recesses 29 and 30, these edge portions or beads being joined by a relatively thin web 34. The relation of parts is such that when the member 31 is inserted in the recesses 29 and 30 by relative longitudinal movement, the sections 11 and 12 are locked together in, ordinarily, substantially continuous abutment.

The side section 14 is identical with the side section 13, turned around.

The tread section 35 shown in Figure 2 has at its margins longitudinally extending feet or pedestals 36 and 37 adapted to support the tread in the same planes as the treads 11 and 12. As is evident the tread section 35 may be readily interposed between the sections 11 and 12 and securely joined with the latter by means of interlocking members 31. The tread surface conformation of section 35 is similar to that of sections 11 and 12 and the land surfaces are all co-planar as here shown.

The side sections as in 13 and 14 may be of uniform dimensions while the tread sections may be of various widths, particularly the intermediate sections such as 35. In this manner the tread is adaptable to various requirements as to width.

The various joints may be made tight so as to provide a transversely rigid structure or the clearances may be such that there can be a slight rocking movement between the various sections so as to compensate to some extent for unevenness of the supporting surfaces. The flanges as at 25 serve as guards and since the flanges as at 27 have half the width of the lands 24, they do not impair the uniformity of the tread surface. It will be understood, however, that so far as the sectional construction is concerned the configuration of the tread face is immaterial.

However, the particular dove-tail groove formation shown is utilizable for the retention of replaceable tread strips 38 and casings 39. The tread strip 38 as shown in Figures 1 and 4, has a base portion substantially conforming to the dove-tail grooves in cross section although generally with more nearly upright side surfaces as at 40. The tread strip 38 has a laterally beaded or flanged upper portion 41. The strip may be of molded hard rubber or of other suitable material and may desirably have embedded in its top portion particles of abrasive material such as small grains of sand or the like, so that a non-skid surface is provided.

The base portion 40 is received in the casing 39 which is in the form of a channel strip of light springy metal and has a bottom wall 42 and the side walls 43 and 44, these latter being inclined upwardly toward each other so that the channel is of dove-tail section. The upper portions of the side walls are bent over and downwardly to form spring flanges 45 and 46 which in their natural relation are sprung outwardly as shown in Figure 5 and this outward flare may be enhanced by an outward bend as at 47, Figure 5.

In assembly, both the casing and the tread strip may be inserted in a groove 22 together or separately by relative longitudinal movement. With the parts assembled as in Figure 1, the lower edges of the flanges bear against the side walls of the groove and their reaction flexes the upper portions of walls 43 and 44 into engagement with the side walls as at 40 of the tread strips. The strips are thus centered in the grooves and are held frictionally against displacement relative to the casings, the latter being held frictionally against displacement relative to the grooves.

By proportioning the base portion of the tread strip as in Figure 1 so that its maximum width is less than the minimum width of the groove 22, allowing also for the presence of the channel strip side walls, the tread strip may be forced downwardly into the casings or pulled upwardly therefrom with the latter in the groove, this being a very convenient feature of replaceability. The flanged upper portion completely overlies the spaces between the base portion of the tread strip and the groove side walls.

It will be understood that variations in the arrangement and form of the parts may be made without departure from the invention, and as to these variables, I do not limit myself except as in the following claims.

I claim:

1. A metal door saddle comprising a tread section and a side section, said side section having marginal portions providing support and an elevated medial portion with a flat top, one of said marginal portions having a longitudinally extending, upwardly facing, downwardly enlarged recess and the other marginal portion having a downwardly inclined upper surface, the tread section having a rib substantially complementary to said recess and engageable in the latter only by relative longitudinal movement of the sections, the tread section having a marginal flange projecting laterally beyond the rib, closely overlying said medial portion of the side section when said sections are engaged together and shielding the joint between the sections.

2. A metal door saddle comprising a tread section having a longitudinally extending dove-tail groove in its top face, a tread strip having a base portion substantially complementary to said groove and receivable in the latter by relative longitudinal movement, and a channel strip of spring metal in said groove and receiving the base portion of said tread strip, at least one side wall of said channel strip having a spring flange depending from its upper edge, the free edge portion of said flange yieldingly engaging the adjacent groove wall to resist displacement of the channel strip in the groove, the reaction of said flange on its associated channel strip wall urging the upper portion of the latter against the adjacent side wall of the tread strip to resist displacement of the latter relative to the channel strip.

3. A metal door saddle comprising a tread section having a longitudinally extending dove-tail groove in its top face, a tread strip having a base portion substantially complementary to said groove and receivable in the latter by relative longitudinal movement, and a channel strip of spring metal in said groove and receiving the base portion of said tread strip, said channel strip having spring flanges depending from its upper edges, the free edge portions of said flanges yieldingly engaging the adjacent groove walls to resist displacement of the channel strip in the groove and to center the channel strip in the groove, the reaction of said flanges on their respective channel strip walls urging the upper portions of the latter against the adjacent side walls of the tread strips to resist displacement of the latter relative to the channel strip.

4. A metal door saddle comprising a tread section having a longitudinally extending dove-tail groove in its top face, a tread strip having a base portion substantially complementary to said groove and receivable in the latter by relative longitudinal movement and a channel strip of spring metal in said groove and receiving the base portion of said tread strip, said channel strip having spring flanges depending from its upper edges, the free edge portions of said flanges yieldingly engaging the adjacent groove walls to resist displacement of the channel strip in the groove and to center the channel strip in the groove the reaction of said flanges on their respective channel strip walls urging the upper portions of the latter against the adjacent side walls of the tread strips to resist displacement of the latter relative to the channel strip the maximum width of said base portion being less than the minimum width of said groove so that the tread strip is directly downwardly insertable into the groove and into the channel strip in the latter.

5. A metal door saddle comprising a tread section having a longitudinally extending dove-tail groove in its top face, a tread strip having a base portion substantially complementary to said groove and receivable in the latter by relative longitudinal movement, and a channel strip of spring metal in said groove and receiving the base portion of said tread strip, said channel strip having spring flanges depending from its upper edges, the free edge portions of said flanges yieldingly engaging the adjacent groove walls to resist displacement of the channel strip in the groove and to center the channel strip in the groove, the reaction of said flanges on their respective channel strip walls urging the upper portions of the latter against the adjacent side walls of the tread strips to resist displacement of the latter relative to the channel strip, said tread strip having top lateral flanges overlying the spaces between said base portion and the groove side walls.

6. A metal door saddle comprising a pair of elongated tread sections extending side by side and having their adjacent edge faces provided with longitudinally extending, inwardly enlarged, cross sectionally rounded grooves, a unitary, solid metal strip locking the sections together and comprising cross sectionally rounded, beaded edge portions complemental in shape to said grooves and receivable therein by relative endwise movement only, and a pair of independent side sections connected to and supporting the opposite, outer edge portions of said tread sections, said edge portions each including an outwardly projecting flange overlying the uppermost surface of the side sections and shielding the joint between the side sections and the tread sections.

7. A door saddle comprising a tread section having its upper surface shaped to provide alternating dove-tail ribs and grooves, a metallic channel strip having outwardly and downwardly flaring side walls complemental in shape with and disposed in each of said grooves with portions of its side walls in engagement with the sides of said ribs, and a tread strip of anti-slipping, abrasive material in each of said channel strips, said tread strips having dove-tail lower portions secured in the channel strips and upper portions projecting above the level of said ribs, thereby providing a raised, non-slipping surface for the tread section.

8. A door saddle comprising a tread section having its upper surface provided with a plurality of parallel dove-tail grooves, a metallic channel strip for each groove, having downwardly and outwardly flaring side walls shaped to engage the side walls of said grooves, and a tread strip of anti-slipping abrasive material in each of said channel strips, the tread strips having dove-tail bottom portions held in the channel strips and upper portions projecting above and laterally beyond the margins of the dove-tail grooves in the tread section.

9. A door saddle comprising a substantially horizontal tread section provided with a plurality of dove-tailed grooves in its upper surface, a complemental, dove-tail channel strip in each groove, and an anti-slipping tread strip secured in each channel strip, said tread strips each comprising a lower, outwardly and downwardly flaring dove-tail portion secured in the associated channel strip and an upper portion having shoulders disposed above and extending laterally beyond and overlying the upper margins of the associated dove-tail groove.

FRED W. KAMMERER.